United States Patent

Roinestad

[15] 3,682,295
[45] Aug. 8, 1972

[54] EDGE DRIVEN CONVEYOR SYSTEM
[72] Inventor: Gerald C. Roinestad, Winchester, Va.
[73] Assignee: Ashworth Bros., Inc., Fall River, Mass.
[22] Filed: May 11, 1970
[21] Appl. No.: 36,008

[52] U.S. Cl..................................198/203, 198/136
[51] Int. Cl..........................B65g 23/00, B65g 15/00
[58] Field of Search......198/181, 182, 203, 136, 192, 198/137

[56] References Cited

UNITED STATES PATENTS

| | | |
|---|---|---|
| 3,270,863 | 9/1966 | Ackles......................198/181 |
| 2,386,558 | 10/1945 | Kleintop....................198/203 |
| 3,348,659 | 10/1967 | Roinestad..................198/182 |
| 2,267,970 | 12/1941 | Boal..........................198/136 |
| 2,446,890 | 8/1948 | Stadelman..................198/182 |
| 2,990,940 | 7/1961 | Merchant...................198/137 |
| 2,322,766 | 6/1943 | Maywald....................198/137 |

*Primary Examiner*—Richard E. Aegerter
*Attorney*—Birch, Swindler, McKie & Beckett

[57] ABSTRACT

A conveyor system including an endless flat belt capable of bending in an edgewise direction and a supporting and driving assembly which supports the belt in any of a variety of endless paths which may include straight runs and curved runs, including a friction edge drive in combination with any of several means to maintain the belt in the requisite driving engagement with the edge drive.

19 Claims, 14 Drawing Figures

INVENTOR
GERALD C. ROINESTAD

EDGE DRIVEN CONVEYOR SYSTEM

BACKGROUND OF THE INVENTION

This invention relates to endless conveyor belt systems and to friction edge drives therefor and particularly such systems utilizing metallic belts capable of negotiating edgewise horizontal curves.

In many situations, it is desirable to provide an endless conveyor belt of unrestricted length in a conveyor system laid out in any of a plurality of desired endless paths which might include one or more runs traveling straight and horizontal, around horizontal curves in either direction, up hill or down hill, Moreover, it is frequently desired that the conveying proceed in such systems without transfers either from one belt to another or across an interruption in the same belt. Some success has been achieved in operating conveyors in such arrangements with cable or chain type conveyors. However, there has been little notable success in operating a belt-type conveyor in such unrestricted paths because of the difficulty of coordinating the multiplicity of drives necessary to keep the belt within its specific strength limitations and within the strength capacities of the various drives. In most cases, the prior art has attempted to utilize a plurality of positive drives, for example, drives or "wrap-around" drive pulleys which move the belt at a fixed speed equal to the speed of the drive. Such arrangements have generally proven excessively expensive and mechanically difficult. The latter difficulty resides primarily in the almost unsurmountable problem of coordinating a plurality of positive drives. There have been some attempts to combine positive and frictional drives in the same system but no such system has achieved the versatility and success of the present invention.

SUMMARY OF THE INVENTION

To overcome the disadvantages of the prior art, an object of this invention is to provide an improved conveyor system of the type utilizing flat belts with a novel frictional edge drive which enables the conveyor to be arranged in an endless path substantially unrestricted in length or configuration.

A further object of the invention is to provide such a system in which the belt may be smoothly and economically driven under minimal tension.

A further object of the invention is to provide an improved friction edge drive for conveyor belts.

Generally described, one aspect of the invention relates to a conveyor system which comprises an endless flat conveyor belt supported in an endless path and a friction drive means engaging an edge of the belt. The friction drive means includes an endless chain movable through an endless path having a run parallel to the friction driven edge of the belt and a plurality of frictional driving elements connected to the chain at spaced locations, said elements defining first frictional driving surfaces extending vertically and drivingly engaging the belt edge and second frictional driving surfaces extending horizontally under the edge of the belt and drivingly engaging and supporting the bottom of the belt adjacent the driven edge, and power means to drive the endless chain to move the frictional driving elements in the same direction as and faster than the speed of the belt edge so that the first and second frictional driving surfaces slide along and frictionally drive the belt. There are also provided means to urge the belt and friction drive means together to maintain the frictional driving engagement therebetween. On straight runs of the belt, the means to urge the belt and drive means into engagement may be a device exerting a resilient lateral force thereon. Where the friction-driven run is around a curve, the frictional driving engagement may be maintained by the provision of either a tension take-up device tending to resiliently expand the belt or a positive drive used in combination with the friction drive to move the belt at a predetermined speed such that the driven edge of the belt moves at a slower speed than the edge drive mechanism.

The friction drive of the present invention which frictionally drives the edge of the belt and also frictionally drives and supports the bottom of the belt adjoining such edge is particularly useful in combination with a positive drive means operable at a predetermined speed and engaging the belt to drive the belt at such predetermined speed but which positive drive means lacks the capacity to exert by itself the force required to move the belt through its entire endless path. At least one of the supplemental friction drive means is mounted in engagement with an edge of the belt to maintain the tension of the belt at the positive drive means and at each friction drive means within the capacities of each respective drive means and the belt itself.

Another aspect of the invention resides in a conveyor system employing the type of endless flat conveyor belt which is made up of a plurality of links collapsibly connected together to permit the belt to selectively bend edgewise within its own plane in a lateral direction. Such a conveyor belt is supported in an endless path including a vertical spiral having a plurality of vertically spaced spiral loops. The belt is disposed in the spiral with a generally horizontal cross-section and curving edgewise within its own plane around arcuate portions of the spiral loops. Two such spirals may be employed with the loops of the two spirals alternatingly spaced between each other. The belt extends longitudinally upwardly along one of the spirals turning around at the top of the spirals and downwardly along the other of the spirals. The belt is moved by the driving means in one circumferential direction in one spiral and in the opposite circumferential direction in the other spiral.

The edge drive of the present invention is particularly useful as the drive means for a spiral system as above described. The chain driven friction drive means may engage the inner edge of the belt in the spiral loops with or without supporting the edge of the belt and drive the belt in cooperation with means to apply to the belt tension sufficient to maintain the frictional driving engagement but insufficient to tilt the belt laterally away from the horizontal.

The invention also extends to the novel friction edge drive itself. Such drive comprises a support means defining an endless track, an endless chain supported by the support means and having follower elements connected thereto slidably and guidingly engaging the track and a plurality of first and second frictional driving elements mounted at spaced locations along the endless chain. The first driving elements define a vertical driving surface facing outwardly from the chain. The second driving elements define a horizontal driving and belt supporting surface extending outwardly from and below the vertical driving surface. Accordingly, the vertical and horizontal driving surfaces are engageable in driving relation with an edge and in driving and supporting relation with the bottom of the conveyor adjacent such edge.

BRIEF DESCRIPTION OF THE DRAWINGS

The invention having been generally described, illustrative specific embodiments will now be set forth in detail with reference to the accompanying drawings in which.

Figure 1:
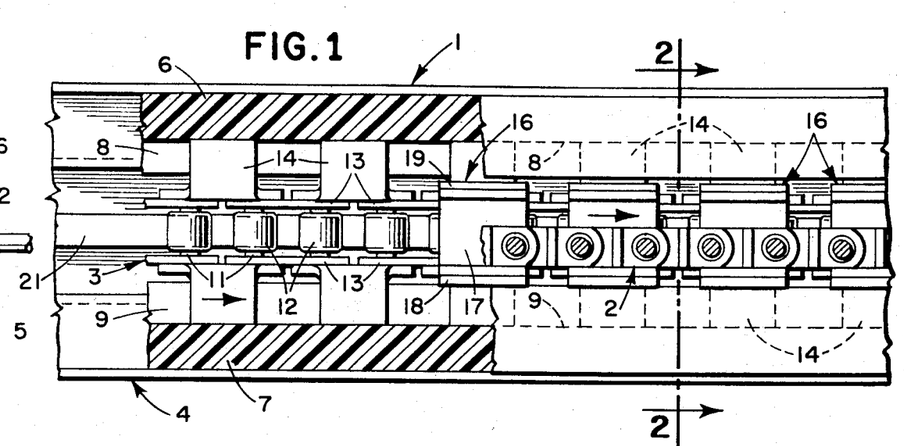
FIG. 1 is a fragmentary side elevation, partially in section, of a friction edge drive for a conveyor belt according to the present invention.
Figure 2:
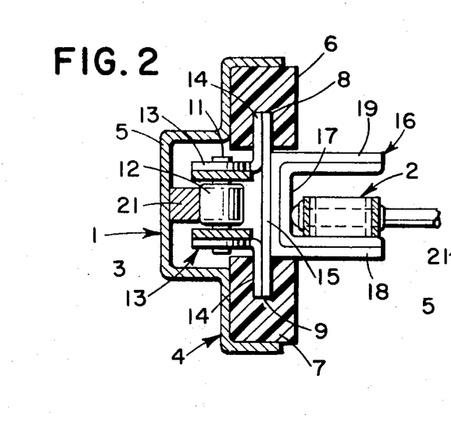
FIG. 2 is a vertical section of the friction drive of FIG. 1.

Depicted in FIGS. 1 and 2 is a frictional edge drive 1 for a flat conveyor belt 2 which is the type belt disclosed in Roinestad U.S. Pat. No. 3,225,898 and is shown in some detail in FIG. 5. The conveyor belt 2 is made up of a plurality of links collapsibly connected together by cross rods to permit the belt to selectively bend edgewise within its own plane in either lateral direction. Other belts capable of such selective bending are disclosed in U.S. Pat. Nos. 2,872,023 and 3,261,461. It will be understood that the frictional edge drives of the invention also may be employed in certain installations with metallic link conveyor belts which are not capable of edgewise bending. These latter belts may be employed in straight runs or in runs of fixed curvature as well known in the art.

The frictional edge drive 1 utilizes an endless roller chain 3 and guiding support 4 for the chain. The support 4 includes an elongated generally channel-shaped casing 5 and a pair of elongated bars 4 and 7, preferably of a low friction material, such as any of the suitable synthetic resinous plastics having the requisite strength and durability. The bars 6 and 7 have grooves 8 and 9 extending respectively throughout their lengths. The bars 6 and 7 are mounted in the casing 5 with the grooves 6 and 7 in mutually opposed relation facing each other to define a guiding track.

The endless roller chain 3 is conventional and comprises a plurality of spaced vertical pivot pins 11 surrounded by freely rotatable rollers 12. The pins are connected together axially outside of the rollers 12 by a plurality of links 13. Since the pivot pins 11 are vertical, the chain may freely bend in a horizontal direction about the pivot pins. The construction of the chain 3 is sufficiently loose to enable it to be twisted over a distance of several feet through 90° with the pins 11 being vertical at one end of the twist and horizontal at the other end.

Affixed to the links 13, as by welding, are a plurality of spaced rods 14 which extend upwardly and downwardly from the chain 3 into the grooves 8 and 9 to function as follower elements slidably and guidingly engaging the track provided by the grooves 8 and 9. The rods 14 include a strap 15 which extends between the rods across the chain 3. Affixed to the chain 3 at spaced locations, as by welding to the straps 15, are a plurality of frictional driving elements 16 in the form of channel sections. The elements 16 include a vertical web portion 17 which provide a first frictional driving surface extending vertically and facing outwardly from the chain 3 for engaging the edge of the belt in frictional driving relation. The channel elements 16 also have horizontal flanges 18 which provides second frictional driving surfaces mounted at spaced locations along the chain 3 and each defining a belt driving and supporting surface extending outwardly from and below the vertical driving surface 17 to engage in frictional driving and supporting relationship the bottom of the conveyor belt 2 adjacent its edge. The members 16 also may include upper horizontal flanges 19 which are spaced above and parallel to the flanges 18 to extend over the belt edge. Thus the upper flanges 19 can serve as hold down members. However, the members 19 may be eliminated if desired to leave the driving element 16 L-shaped rather than channel-shaped.

Attached to the interior of the casing 5 is an elongated strip 21 of preferably low friction material which provides a guide and backing strip for the rollers 12 of the chain 3. The chain 3 is driven in the normal manner by a standard sprocket 22 as shown for example in FIG. 5. The sprocket extends through a slot 23 in the casing 5 to drive the chain.

Figure 13:
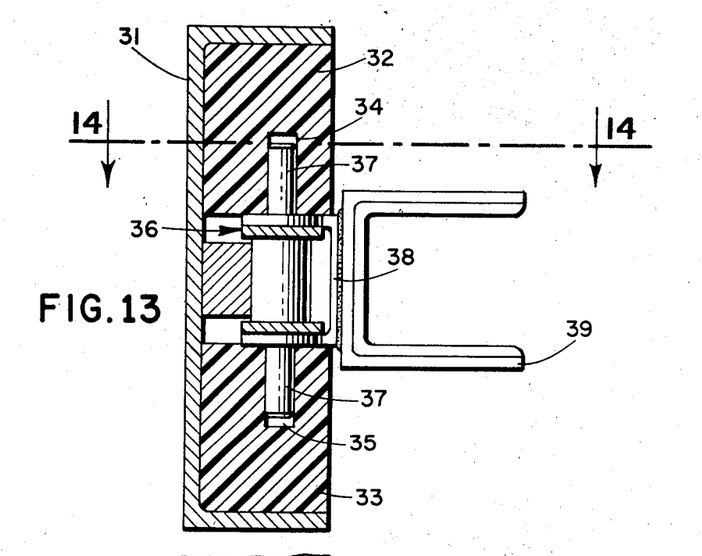
FIG. 13 is a vertical sectional view showing a modified form of the edge drive of FIGS. 1 and 2.
Figure 14:
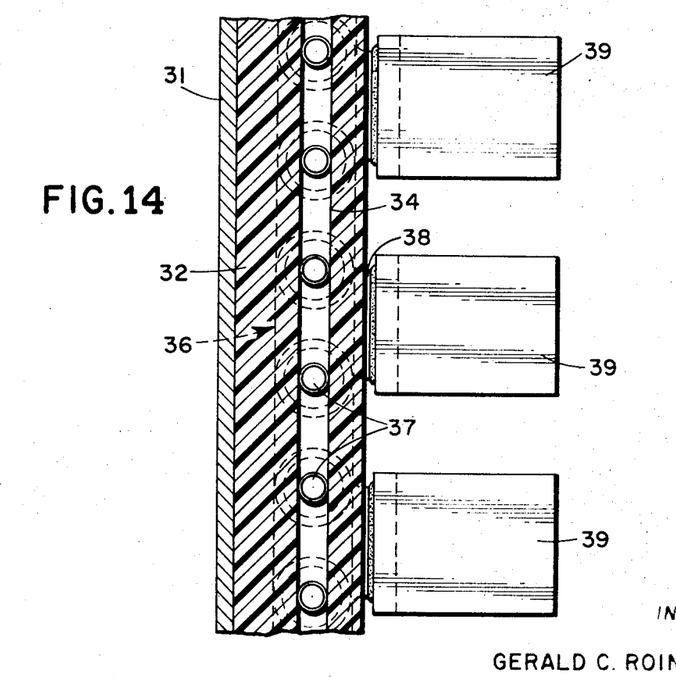
FIG. 14 is a horizontal sectional view taken along the line 14—14 of FIG. 13.

A modification of the edge drive mechanism of FIGS. 1 and 2 is shown in FIGS. 13 and 14. In this embodiment, the support for the chain is provided by a channel-shaped casing 31 having attached thereto a pair of low friction plastic bars 32 and 33, which contain grooves 34 and 35. The standard roller chain 36 includes pivot pins 37, which have end extensions protruding upwardly and downwardly into the grooves 34 and 35 to provide the follower elements for the chain. In the same manner as the chain 3, the chain 36 has the pins 37 connected by links 38 which are generally U-shaped. To the links 38 are welded a plurality of channel-shaped frictional driving elements 39 which are identical to the members 16.

Figures 3, 4:
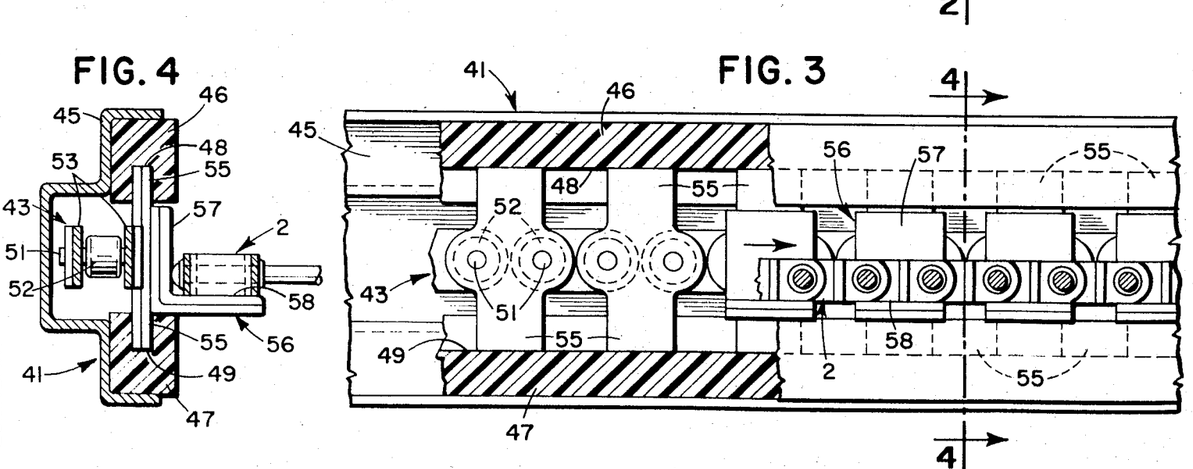
FIG. 3 is a fragmentary side elevation, partially in section, of a second embodiment of the frictional edge drive according to the invention.
FIG. 4 is a vertical section of the friction edge drive of FIG. 3.

Shown in FIGS. 3 and 4 is a frictional edge drive mechanism similar to that shown in FIGS. 1 and 2 except that the former is adapted for travel around vertical curves whereas the latter is adapted for travel around horizontal curves. With reference to FIG. 4, the edge drive mechanism 41 includes a roller chain 43 supported within a casing 45 to which is attached guide bars 46 and 47 having opposed grooves 48 and 49 facing each other. The roller chain 43 includes horizontally disposed pivot pins 51 surrounded by rollers 52 and connected together by links 53. Attached to the links 53 are rods 55 which extend upwardly and downwardly into grooves 48 and 49 to serve as follower elements for the roller chain 43. Attached to the rods 55 are a plurality of spaced driving elements 56 which have a vertical driving surface 57 and horizontal driving surface 58.

Figure 5:
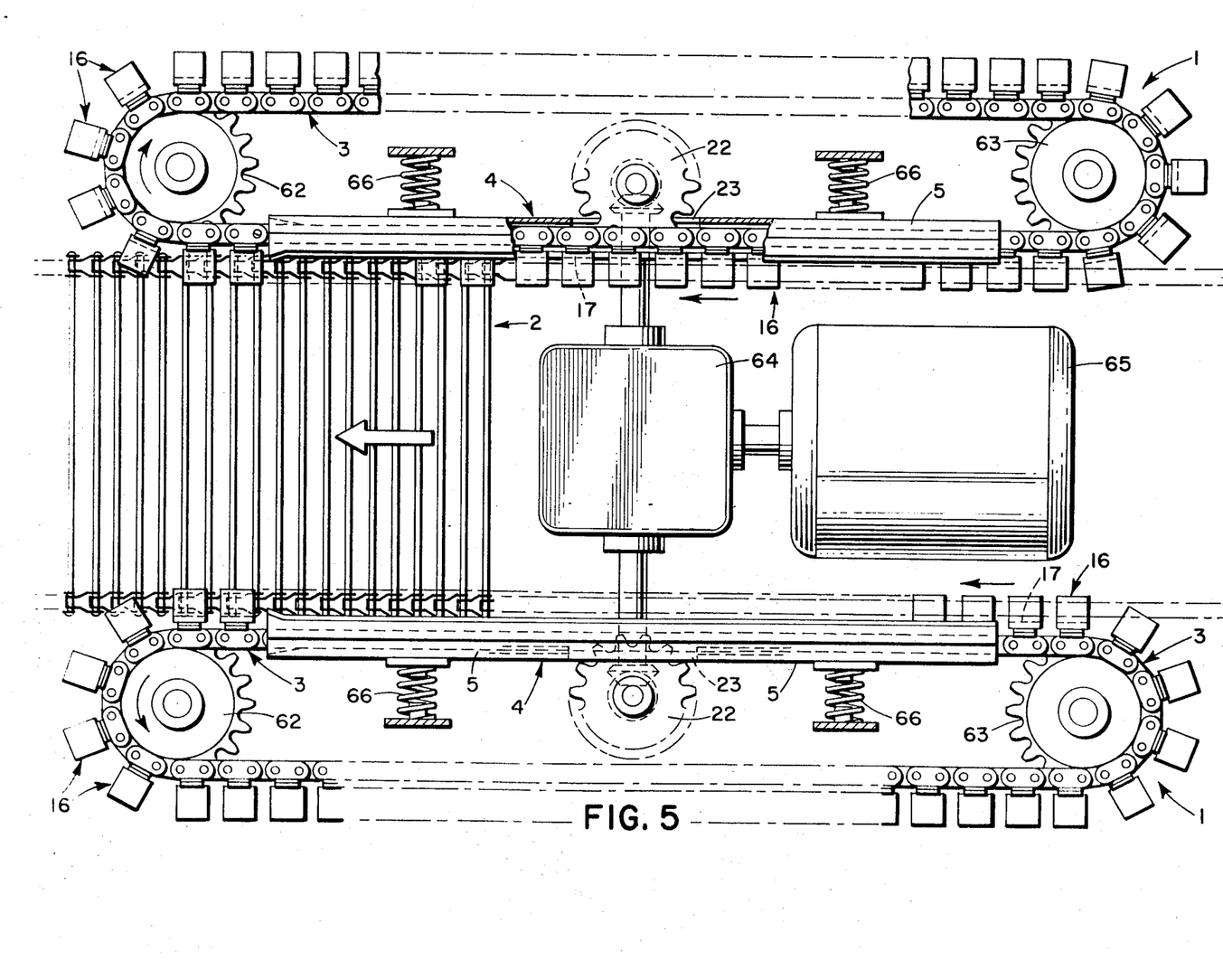
FIG. 5 is a plan view of a portion of a conveyor system utilizing a pair of opposed friction edge drives, as shown in FIGS. 1 and 2, to drive a straight run of a conveyor belt.
Figures 6, 7:
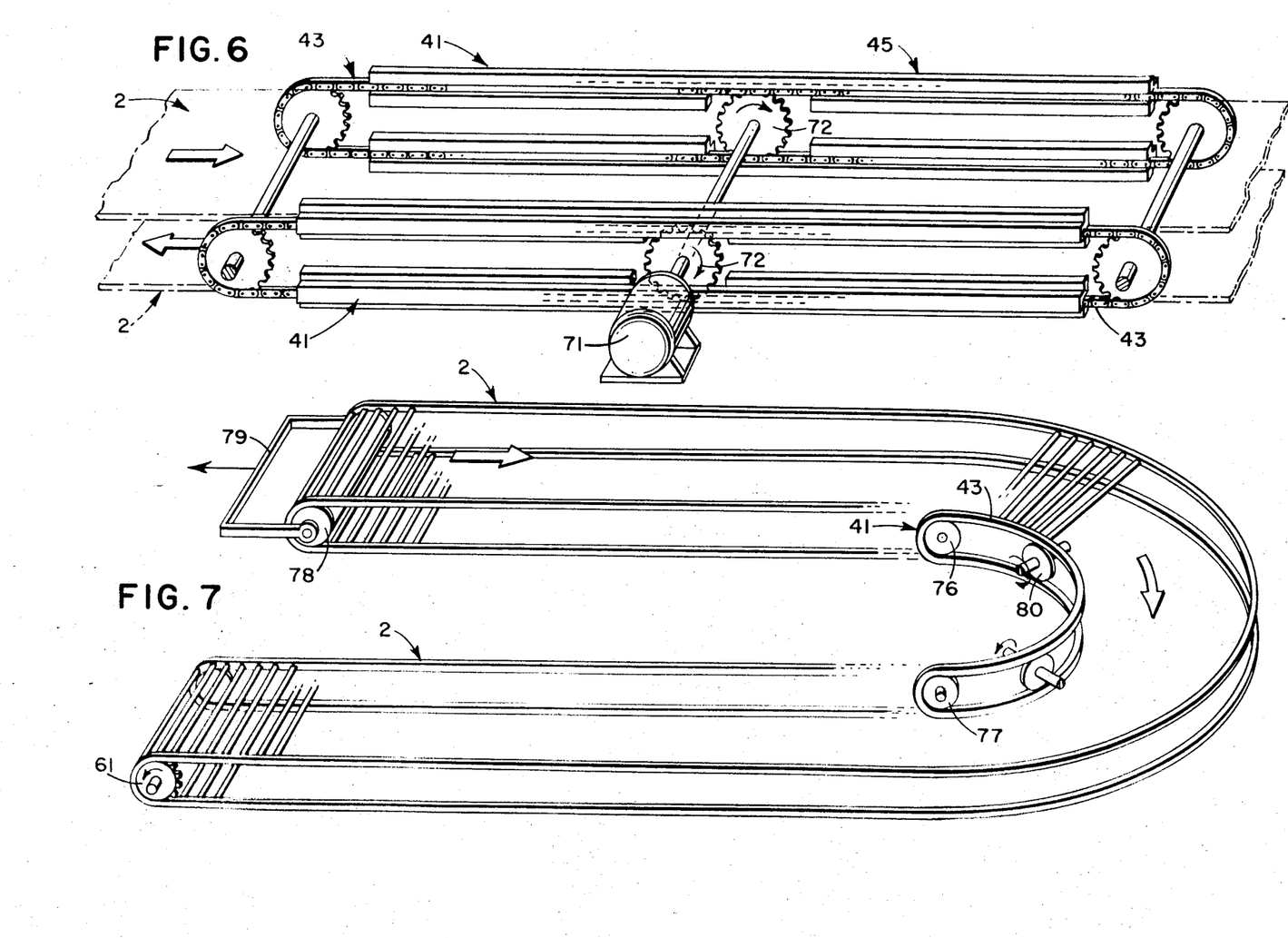
FIG. 6 is a schematic perspective of a straight conveying run of a belt and an underlying return run of the belt both driven by a friction edge drive of the type shown in FIGS. 3 and 4.
FIG. 7 is a schematic perspective of a curved conveying run and underlying return run both driven by an edge drive of the type shown in FIGS. 3 and 4.

Illustrated in FIG. 5 is a typical installation of an edge drive mechanism 1 as shown in FIG. 2. A conveyor belt 2 passes along a straight run driven by a positive drive such as a drive sprocket 61 as illustrated in FIG. 7. The sprocket 61 is driven by a suitable power source, not shown, to move the sprocket teeth at a predetermined speed. The sprocket teeth engage the belt 2 to drive the belt at the same predetermined speed. A positive driving force may be supplied by any mechanism which engages the belt at a particular speed and forces the belt to follow the driving mechanism at the same predetermined speed at which the driving element moves. A pair of friction drives 1 are located on opposite sides of the straight run of the belt 2 in horizontally opposed relation to each other. In each case the roller chain 3 of the friction drive 1 extends in an endless path around idler sprockets 62 and 63 and are driven by drive sprockets 22 which in turn are driven through a transmission 64 by a hydraulic motor 65. The frictional driving elements 16 which are connected to the roller chain 3 at spaced locations have their vertical driving surfaces 17 engaging the edge of the belt 2 and their horizontal driving surfaces drivingly engaging and supporting the bottom of the belt adjacent such edge. The hydraulic motor 65 is driven at a speed relative to the power source for the belt drive sprocket 61 (FIG. 7), such that the driving elements 16 are moved in the same direction as and faster than the speed of the respective edges of the belt which they engage. Springs 66 are mounted to exert a pressure on the roller chain 3 toward the belt 2 to maintain the frictional driving engagement between the belt and the frictional driving elements 16.

Shown in FIG. 6 is a typical installation for an edge drive mechanism 41 as shown in FIGS. 3 and 4. In this instance, an edge drive 41 is mounted to engage both edges of a straight conveying run of a belt 2 as well as the underlying parallel return run of the same belt. The roller chain 43 of each of the edge drives 41 in FIG. 6 is mounted on one side of the belt with the chain having an upper run in which its driving elements frictionally engage and support the edge of the conveying run of the belt and a lower run in which its frictional driving elements frictionally engage and support the edge of the return run of the belt. Each of the roller chains 43 is driven by a motor 71 through drive sprockets 72. Here, as in each case involving an edge drive along a straight run, resilient means, like that of FIG. 5, applies a resilient force normal to the belt to urge the edge drive into driving engagement with the belt.

Depicted in FIG. 7 is an installation of an edge drive mechanism 41 engaging the inner edge of a belt 2 as the belt travels around a horizontal curve bending edgewise in the plane of the belt. In this instance the roller chain 43 of the frictional edge drive mechanism 41 is mounted in an endless path around a pair of idler sprockets 76 and 77 and is driven by drive sprocket 80 along the edge of the belt in both the conveying run and the aligned return run of the belt as it passes around the horizontal curve. The roller chain 43 has an upper run in which its frictional driving elements engage the edge and bottom of the conveyor belt 2 in driving and supporting relationship and a lower run in which its frictional driving elements engage the edge and bottom of the return run of the belt in driving and supporting relationship. The end of the belt opposite the positive drive sprocket 61 passes around a pulley 78 which is connected to a tension pick up mechanism 79 which applies a resilient pulling force to the belt in the direction of the arrow in the well known manner.

Whenever the edge drive 41 is utilized on vertically spaced, parallel belt runs as in FIGS. 6 and 7, it is desirable to offset the idler sprockets horizontally outwardly from the driving portion of the chain to facilitate insertion and removal of the driving elements relative to the belt.

Figure 8:
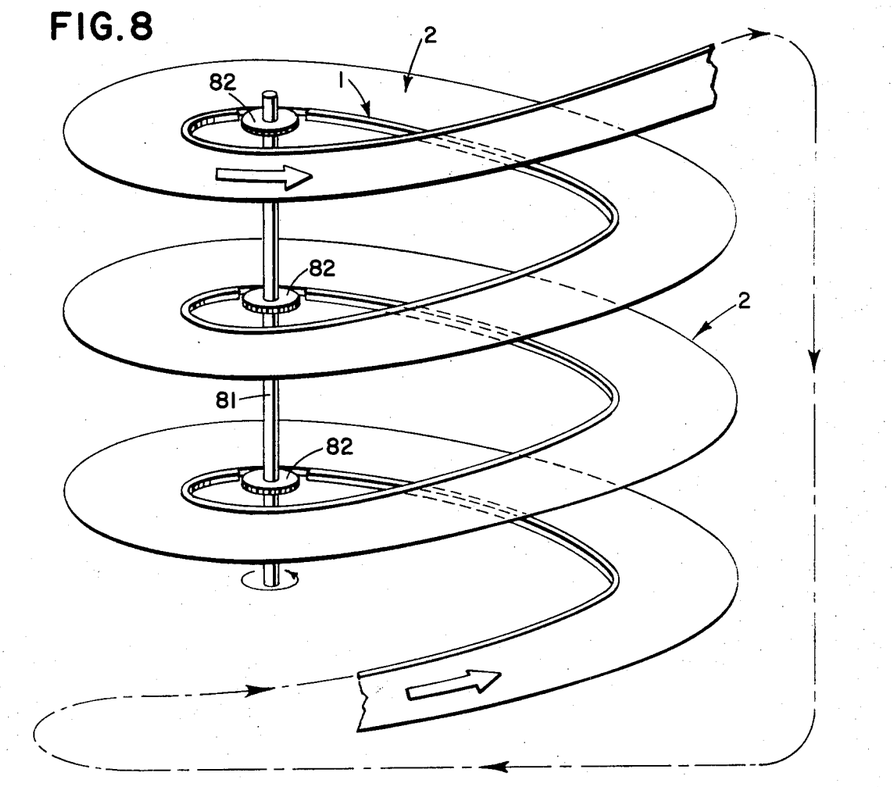
FIG. 8 is a schematic perspective of a spiral conveyor system driven by an edge drive of the type shown in FIGS. 1 and 2.

Another utility for the edge drive mechanism 1, as shown in FIGS. 1 and 2, is illustrated in FIG. 8. In this instance, the conveyor belt 2 is arranged in a vertical spiral in which the belt moves, with a horizontal cross-section, longitudinally through and bends edgewise within its own plane around a plurality of vertically spaced spiral loops which define a series of equal coaxial circles with the inner edge of the belt in the several loops defining therewithin a cylinder. The edge drive 1 is schematically shown to be driven by a shaft 81 and drive sprockets 82. The edge drive 1 has its frictional driving elements engaging the inner edge of the belt at spaced locations substantially throughout the length of the spiral loops. In the installation shown in FIG. 8, the belt is passed from the top of the spiral directly downwardly to the bottom of the spiral. The edge drive may or may not follow the belt continuously through this return portion.

Figure 9:
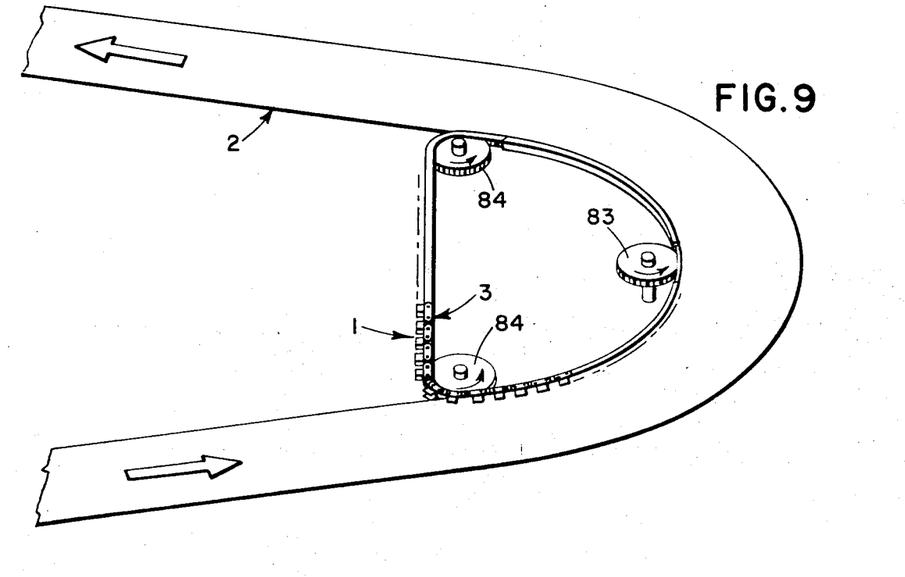
FIG. 9 is a schematic perspective of an edge drive of the type shown in FIGS. 1 and 2 in combination with a conveyor belt moving around an arcuate curve.

In FIG. 9 there is shown an edge drive mechanism 1 which frictionally drives a belt 2 around a simple horizontal arcuate curve. In this instance, the edge drive is operated by a drive sprocket 83 and extends around a pair of idler sprockets 84.

Figure 10:
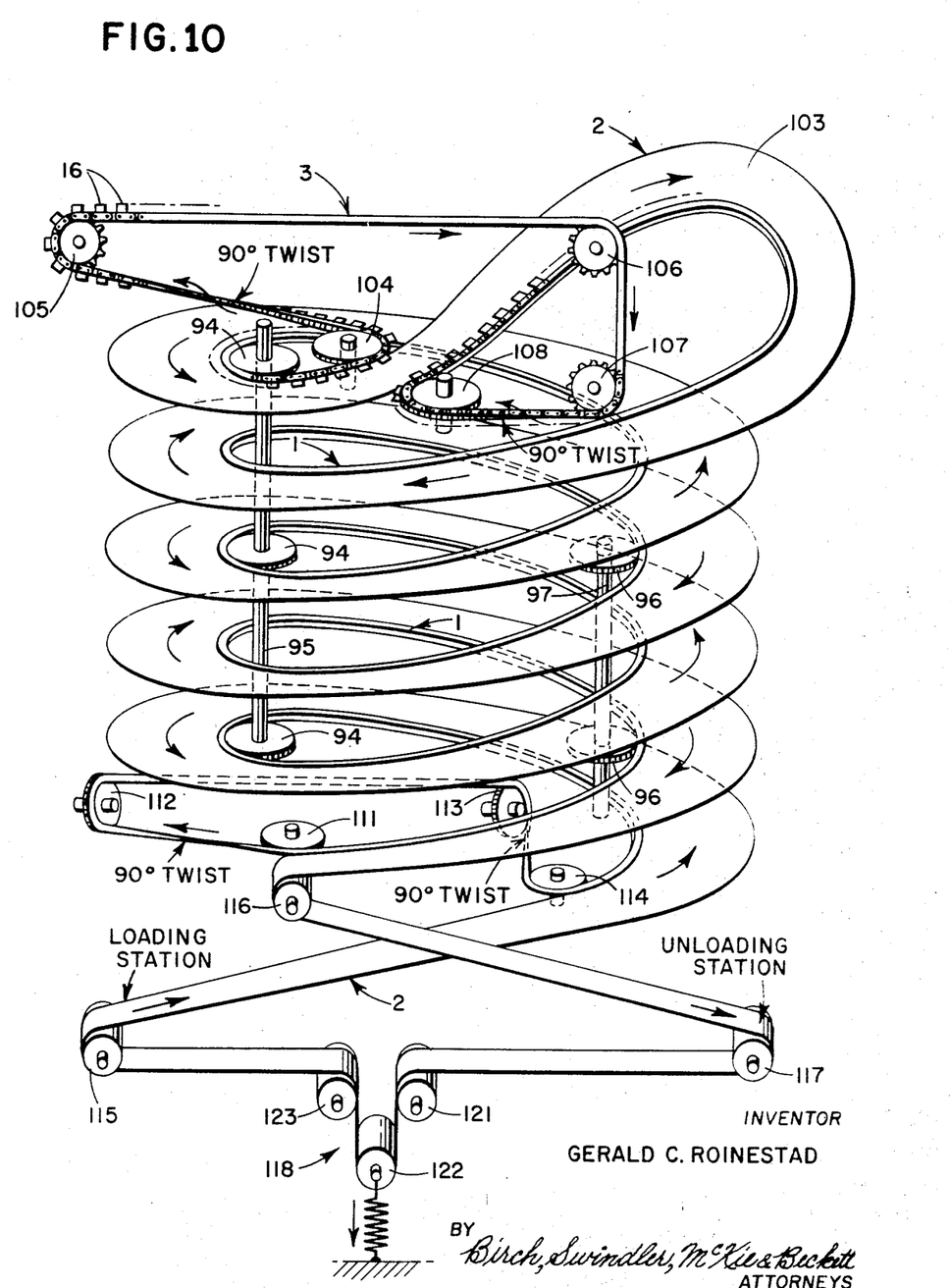
FIG. 10 is a schematic perspective of a conveyor system utilizing an edge drive of the type shown in FIGS. 1 and 2 to move a conveyor belt up along a spiral and down along a second spiral between the loops of the first spiral.
Figure 11:
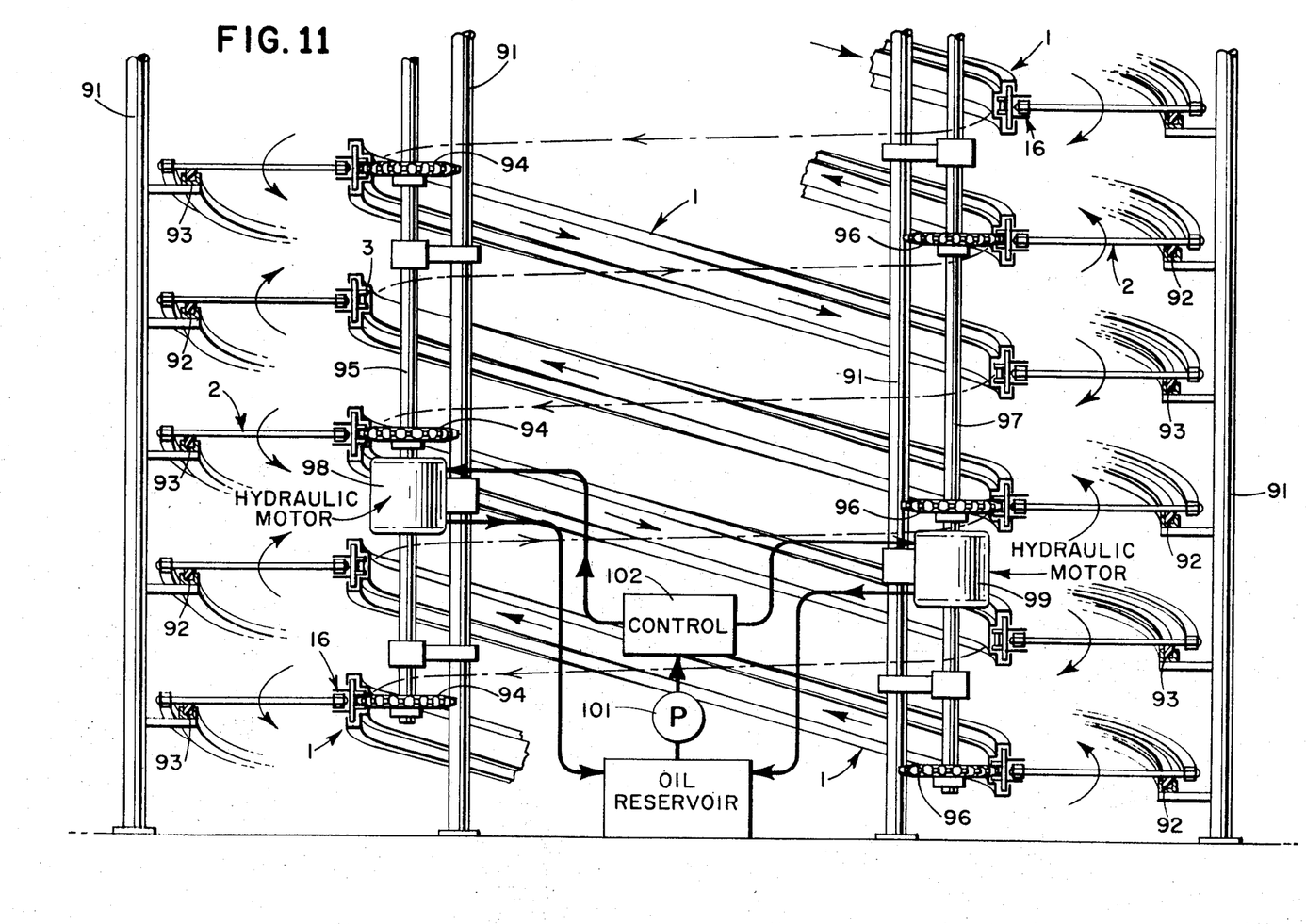
FIG. 11 is a vertical sectional view showing in greater detail a portion of the conveyor system in FIG. 10.

Shown in FIG. 10 and 11 is a spiral conveyor system which represents one aspect of the present invention. In such system, the conveyor belt 2 is supported by a frame 91 (FIG. 11) in an endless path which includes a pair of vertical spirals having a plurality of vertically spaced spiral loops with the loops of the two spirals alternatingly spaced between each other. The loops of each spiral define a plurality of coaxial equal circles. Moreover, the circles of one spiral are equal and coaxial with the circles of the other spiral. The belt 2 is disposed around the spirals with a generally horizontal cross-section and curves edgewise within the plane of the belt around the circular loops of the spirals. The belt extends longitudinally upwardly in one circumferential direction around one of the spirals, turns around at the top of the spirals and returns downwardly in the opposite circumferential direction along the other spiral. The two spirals are superimposed upon one another to define a common cylinder within the inner edge of the curving belt.

The belt 2 is driven through the double spiral system by an edge drive mechanism 1 of the type disclosed in FIGS. 1 and 2. The roller chain 3 of the edge drive mechanism extends spirally along the belt throughout substantially the entire length of the circular loops in contiguous parallel relationship with the inner edge of the belt. The frictional driving elements 16 engage the inner edge of the belt in frictional driving relation and the bottom of the belt adjacent the inner edge in frictional driving and supporting relation. Thus, the frictional elements 16 engage the belt at spaced locations throughout substantially the entire length of the circular loops.

Mounted on the frame 91 is a supporting rail 92 which extends helically upwardly around one of the spirals substantially throughout the length of its loops to support the belt 2 near its outer edge. A similar helical spiral rail 93 is mounted on the frame 91 to support the belt 2 substantially throughout the length of the loops of the other spiral. Each of the supporting rails 92 is preferably formed of a low-friction material such as a tough synthetic resinous plastic material. It will be understood that the supporting rail extends along the belt substantially throughout the entire system. A second such rail is provided along the other side of the lengths of the belt 2, which are not supported by the edge drive 1.

The roller chain 3 is driven by a power means which includes drive sprockets 94 operated by a common shaft 95 to move the roller chain 3 along one of the spirals. Similarly, a plurality of drive sprockets 96 are driven by a common shaft 97 to move the roller chain 3 along the other of the two spirals. The drive shafts 95 are driven in synchronization with each other by hydraulic motors 98 and 99 which in turn are driven by hydraulic fluids supplied by a common pump 101 through a control system 102 which accurately synchronizes the speed of the motors 98 and 99. If desired, synchronization can be further assured by mechanically connecting the shafts 95 and 97 as by a chain extending between oppositely rotating sprockets on the respective shafts.

As shown in FIG. 10, a turn-around loop 103 is provided at the top of the spirals to permit the belt to leave the top of the spiral in which it is passing upwardly, turn around and merge into the top of the spiral in which it is traveling downwardly. The belt 2 remains in its orientation with a horizontal cross-section throughout the turn-around loop 103 so that articles on the belt may pass from one spiral, around the turn-around loop, and to the other spiral without being disturbed. Preferably, but not necessarily, the edge drive 1 extends in driving and supporting relation throughout the length of the turn-around loop 103.

The roller chain 3 of the edge drive mechanism 1 must be removed from the inner edge of the belt at the top of one of the spirals and returned to the inner edge of the belt at the top of the other of the spirals. The same is true at the bottom of the spirals where the roller chain must be removed from the bottom of one of the spirals and returned to the bottom of the other spiral. At both the top and bottom of the spirals, in order to orient the chain so that its frictional driving elements are facing in the right direction when the chain returns to the belt, the chain must be twisted through 180° between the points where it leaves and returns to the belt. Thus at the top of the spiral system, the roller chain is passed around the sprocket 104 and then to the sprocket 105 with a 90° twist between such sprockets, then to the sprocket 106 and the sprocket 107 and finally the sprocket 108 with a 90° twist between these latter two sprockets, and finally back onto the edge of the belt. Similarly, at the bottom of the spiral system, the roller chain is passed around the sprockets 111, 112, 113 and 114 with 90° twists between the sprockets 111 and 112 and between the sprockets 113 and 114. If desired, to avoid the problem of chain transfer at the top and bottom, two or more separate chains with synchronized drives may be employed instead of the single continuous chain.

At the bottom of the spiral system, the belt passes from a pulley 115 at a loading station to the bottom of the first spiral. It then proceeds up and down the spiral system and around the pulley 116 and then in a straight run to a pulley 117 at an unloading station. Between the pulleys 117 and 115 the belt passes over a tension take-up mechanism 118. Here the belt is passed around the pulleys 121, 122 and 123 to form a loop in the belt. A tension spring is applied to the pulley 122 thereby applying a resilient force to the belt tending to enlarge the loop and to expand the belt in the conveyor system. The function of the tension take-up mechanism is to apply sufficient tension to the belt to maintain its frictional driving relationship with the frictional driving elements 16 of the friction drive 1.

Significantly, in the spiral system shown in FIGS. 10 and 11, no positive drive is necessary. The continuous wrapping of the belt around the spiral loops has a tendency to tighten the belt around the loops and the tension take-up mechanism applies sufficient tension to the belt so that it can be driven solely by the friction edge drive mechanism. There is actually no tension in the belt except the slight tension applied to maintain the driving engagement. Thus, the roller chain 1 moves only slightly faster than the edge of the belt which is driven by the friction drive element 16. There is only a very slight backward creep of the belt relative to the edge driving mechanism. The positive drive probably could not be eliminated without the use of the horizontal friction drive elements 18 (FIG. 2) which extend under the belt to support as well as frictionally drive the bottom of the belt adjacent the edge.

However, if desired, in a spiral system of either a single spiral, or a double spiral as shown in FIG. 10, the friction drive mechanism may be applied to the inner edge of the belt only with no engagement being made by the friction drive with the bottom of the belt. In this instance, a second set of rails similar to the rails 92 and 93 would be provided to extend around the inner edge of the belt throughout the length of the spiral loops and the rest of the conveyor system. With that arrangement, a positive drive sprocket and power source must be used in addition to, or in some instances instead of, the tension take-up mechanism 118. The support of the belt in the spiral loops by a pair of low friction rails would be similar to that shown and described in U.S. Pat. No. 3,348,659. There would also be the same correlation between the various driving forces and frictional resistance applied to the belt to prevent tilting of the belt from its horizontal cross section in the loops as described in U.S. Pat. No. 3,348,659.

In all of the systems disclosed, the belt preferably is supported on low friction rails or the like, such rails being eliminated on the side of the belt where it is supported by the friction edge drive. However, other supports may be employed.

Figure 12:
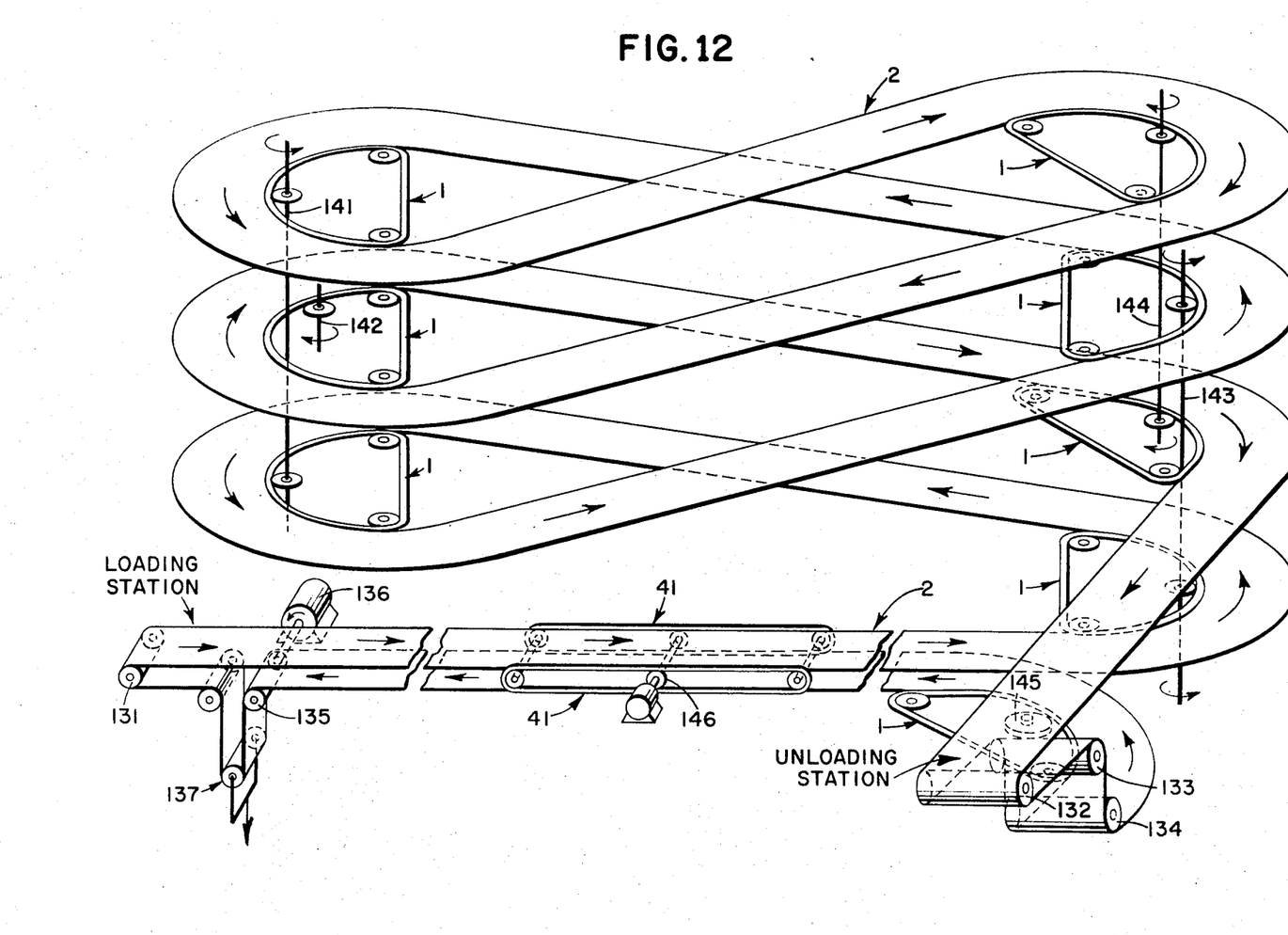
FIG. 12 is a schematic perspective of a "race track" type conveyor system embodying the present invention.

Shown in FIG. 12 is an embodiment of the present invention in a "racetrack" type conveyor system in which the belt 2 is supported with a substantially horizontal cross section in an endless path extending longitudinally and curving edgewise in its own plane through a spiral having a plurality of vertically spaced loops which are horizontally elongated. Each loop defines an oval with arcuate end portions and straight parallel side portions extending tangentially between the arcuate end portions. All of the loops in each spiral are of the same size and configuration and are in vertical alignment with one another. The arcuate ends of the loops are equal and coaxial. One spiral loop extends upwardly and a second spiral loop extends downwardly with the loops in the second spiral also equal in size and configuration and in alignment with each other. Moreover, the loops in one spiral are equal in size and configuration and are coaxially aligned with the loops in the other spiral and are spaced alternatingly therebetween. The belt passes upwardly around one of the spirals in one circumferential direction, turns around at the top of the spirals and passes downwardly around the other spiral in the opposite circumferential direction.

The belt moves to the bottom of the spiral system from a pulley 131 at a loading station along a straight run past a pair of straight parallel opposed friction edge drive mechanisms 41 (as shown in FIGS. 3, 4 and 6) and then tangentially into the first loop of the spiral system. From the bottom of the other spiral, the belt moves tangentially along a straight run to a pulley 132 at an unloading station and then around pulleys 133 and 134. The belt 2 then passes around a horizontal arcuate curve and is engaged by an edge drive mechanism 1 from which it passes in a straight run into engagement with the lower run of the edge drive mechanism 41 and then to a positive drive sprocket 135 driven by a motor 136. The belt then passes around the tension take-up device 137 and back to the loading station pulley 131.

In the system shown in FIG. 12, the belt engages only a single positive drive supplied by the sprocket 135 driven by the motor 136. The positive drive operates at a predetermined speed to drive the belt at the same predetermined speed. The belt is also driven by a plurality of supplemental friction edge drives of the types previously described. Specifically, the belt is driven by an edge drive mechanism 1 of the type disclosed in FIGS. 1, 2 and 9 along the inner edge of each of the horizontal curves in the system. The arcuate portions at the ends of the spiral loops are driven by friction edge drives situated at each of such portions. It will be appreciated that while only two loops are shown in each spiral there may be as many vertically spaced loops as desired.

At one end of the loops, the edge drive mechanisms 1 are driven in one circumferential direction by a common drive 141 and in the opposite circumferential direction by a common drive 142. At the other end of the loops, the edge drive mechanisms 1 are driven in one circumferential direction by a common drive 143 and in the other circumferential direction by a common drive 144. The other arcuate edge drive 1 at the bottom of the system is driven by a drive 145. Finally the straight edge drive device 41 at the bottom of the system is driven by a drive 146. Preferably, the drives 141, 142, 143, 144, 145 and 146 for the various friction edge drive devices are powered by separate hydraulic motors all of which are synchronized with one another through a common pumping and control system which maintains the several drives at the proper relative speeds. Preferably all of the arcuate curves in the system have the same radius so that the speed of the motors driving the belt at such curves would be identical. The edge drives move the roller chains and their spaced frictional driving elements in engagement with the respective edges of the belt 2 and in driving and supporting engagement with the respective bottom portions of the belt adjacent said edges at a speed somewhat faster than such edges travel as a result of the predetermined speed applied to the belt by the positive drive 135. It is to be understood that the longitudinal speed of the belt throughout the entire system is fixed by the speed of the positive drive 135.

The length of the belt relative to its weight requires a longitudinal driving force which far exceeds the capacity of the single positive drive 135. Accordingly the various supplemental frictional edge drive devices are spaced throughout the conveyor system to maintain the tension of the belt at the positive drive and at each of the frictional edges at a level which does not exceed the capacity of any particular positive drive means or frictional edge drive means or of the belt itself. For example, in the "racetrack" system of FIG. 12, additional edge drives may be placed along the straight runs of the loops between the arcuate ends if such runs are excessively long.

The control tension in the belt is important not only at the positive drive but also at each of the frictional edge drives. If the tension in the belt is too high, excessive force is exerted on the roller chain of the frictional edge drive device which may result in failure of such chain. For any given conveyor system, the tension of the belt at any particular point can be mathematically computed. Accordingly, each of the friction drive means is selected with a particular capacity and is positioned at a particular location along the belt to insure that the tension of the belt at all points within the system remains within acceptable limits.

In a system such as that shown in FIG. 12 where a positive drive is combined with one or more friction drives, the latter typically moves about 5 to 15 percent faster than the speed of the belt edge. In spiral systems as shown in FIG. 10, where no positive drive is employed, the friction drives normally move only slightly faster, say from just about 0 to about 5 percent than the speed of the belt edge. However, these ranges are merely typical and can be varied in particular situations.

There has been illustrated and described what is considered to be several preferred embodiments of the invention. However, various modifications may be made without departing from the scope of the invention which is determined solely by the appended claims.

I claim:

1. A conveyor system which comprises
an endless flat conveyor belt supported in an endless path,
friction drive means for said belt comprising
an endless chain movable through an endless path having a run parallel to an edge of said belt
a plurality of frictional driving elements connected to said chain at spaced locations, said elements defining first frictional driving surfaces extending vertically and drivingly engaging said edge of the belt, and second frictional driving surfaces extending horizontally under said edge of the belt and drivingly engaging and supporting the bottom of said belt adjacent said edge, and
power means for driving said endless chain to move said frictional driving elements in the same direction as and faster than the speed of said belt edge so that said first and second frictional driving surfaces slide along and frictionally drive said belt,
means to urge said belt and said first frictional driving surfaces together to maintain the frictional driving engagement therebetween and
positive drive means engaging said belt to drive said belt at a speed less than the speed of said frictional driving elements.

2. A conveyor system according to claim 1 wherein said endless path includes a straight run, said friction drive means engages said belt along said straight run, said means to urge said belt and said first frictional surfaces together includes means to apply a resilient force normal to said belt at said straight run to effect said urging together.

3. A conveyor system according to claim 1 wherein said belt is made up of a plurality of links collapsibly connected together to permit the belt to selectively bend edgewise within its own plane in either lateral direction, said endless path includes at least one lateral curve in the plane of the belt which requires the belt to bend edgewise in said plane as it enters and leaves said curve, and said friction drive means engages the inner edge of the belt along said curve.

4. A conveyor system according to claim 3 wherein said endless path includes a spiral in which said belt moves with a horizontal cross-section longitudinally through and bends edgewise within its own plane around a plurality of vertically spaced spiral loops with at least a portion of each of said loops being arcuate to define said curve, said frictional driving elements engaging said inner edge of the belt at said spaced locations substantially throughout said arcuate portions.

5. A conveyor system according to claim 4, wherein said spiral loops from equal coaxial circles to define a cylinder within said loops, and said friction drive means extends in driving relation with said belt continuously throughout substantially the entire length of said loops.

6. A conveyor system according to claim 5 wherein said endless path includes a pair of said spirals superimposed coaxially upon the same cylinder with the loops of the two spirals alternatingly spaced between each other, said belt and said friction drive means passing upwardly in one circumferential direction along one of said spirals, turning around at the top of said spirals and passing downwardly in the opposite circumferential direction along the other of said spirals, said belt having the same conveying surface facing upwardly throughout said passing upwardly, turning around and passing downwardly, one edge of the belt defining said inner edge during said passing upwardly and the other edge of the belt defining said inner edge during said passing downwardly, and further comprising means to transfer said friction drive means from said one edge to said other edge at the top of said spirals.

7. A conveyor system according to claim 4, wherein said spiral loops are horizontally elongated with said arcuate portions at the ends of the elongated loops and with straight portions extending tangentially between said arcuate portions.

8. A conveyor system according to claim 7, wherein said endless path includes a pair of said spirals in vertical alignment with the loops of the two spirals alternating spaced between each other, said belt passing upwardly in one circumferential direction along one of said spirals, turning around at the top of said spirals and passing downwardly in the opposite circumferential direction along the other of said spirals, said belt having the same conveying surface facing upwardly throughout said passing upwardly, turning around and passing downwardly, one edge of the belt defining said inner edge during said passing upwardly and the other edge of the belt defining said inner edge during said passing downwardly.

9. A conveyor system which comprises
an endless flat conveyor belt,
a positive drive means operable at a predetermined speed and engaging said belt to drive said belt at said predetermined speed, said belt being supported in an endless path of such length that the force required to move the belt through said path exceeds the capacity of said positive drive means, and
at least one supplemental friction drive means comprising
an endless chain movable through an endless path having a run parallel to an edge of said belt,
a plurality of frictional driving elements connected to said chain at spaced locations, said elements defining first frictional driving surfaces extending vertically and drivingly engaging said edge of the belt, and second frictional driving surfaces extending horizontally under said edge of the belt and drivingly engaging and supporting the bottom of said belt adjacent said edge, and
power means for driving said endless chain to move said frictional driving elements in the same direction as and faster than the speed of said belt edge so that said first and second frictional driving surfaces slide along and frictionally drive said belt to maintain the tension of said belt at said positive drive means and at said friction drive means within the capacities of said respective drive means.

10. A conveyor system according to claim 9, wherein said endless belt path includes a run aligned, around a curve in the plane of said belt, said frictional driving elements engaging the inner edge of said belt around said curve.

11. A conveyor system according to claim 10, wherein said conveyor belt comprises a plurality of links collapsibly connected together to permit the belt to selectively bend edgewise within its own plane in either lateral direction and said endless belt path includes runs leading to and away from said curve requiring said belt to bend edgewise as it enters and leaves said curve.

12. A conveyor system according to claim 9, wherein said endless belt path includes a straight run, said frictional driving elements engaging an edge of said belt along said straight run, there being provided means along said straight run to urge said belt and said endless chain against each other to maintain the engagement between said belt and said frictional driving elements.

13. A conveyor system according to claim 12, wherein another of said supplemental friction drive means is located adjacent and in frictional driving relation with the other edge of the belt along said straight run.

14. A conveyor system according to claim 9, including an end pulley around which said belt is moved to provide vertically spaced and aligned aligned aligned parallel runs with said belt moving in opposite directions therein, wherein said endless chain has aligned parallel oppositely moving runs corresponding to the parallel runs of said belt with said frictional driving elements engaging an edge of said belt along each of said parallel runs of the belt.

15. A conveyor system according to claim 9 comprising a plurality of said supplemental friction drive means disposed at spaced locations along the path of said belt.

16. A conveyor system which comprises
an endless flat conveyor belt made up of a plurality of links collapsibly connected together to permit the belt to selectively bend edgewise within its own plane in either lateral direction, said belt being supported in an endless path including a plurality of straight runs and a plurality of curved runs in which the belt bends edgewise,
positive drive means operable at a predetermined speed and engaging said belt to drive said belt at said predetermined speed, said positive drive means having insufficient capacity to supply the total driving force to move said belt through said path, and
a plurality of supplemental friction drive means engaging said belt at spaced locations along said path to maintain the tension of said belt at said positive drive means and at each of said friction drive means within the capacities of said respective drive means, each of said friction drive means comprising
an endless chain movable through an endless path having a run parallel to an edge of said belt,
a plurality of frictional driving elements connected to said chain at spaced locations, said elements defining first frictional driving surfaces extending vertically and drivingly engaging said edge of the belt, and second frictional driving surfaces extending horizontally under said edge of the belt and drivingly engaging and supporting the bottom of said belt adjacent said edge, and
power means for driving said endless chain to move said frictional driving elements in the same direction as and faster than the speed of said belt so that said first and second frictional driving surfaces slide along and frictionally drive said belt,
said supplemental friction drive means being located to engage said belt at a respective curved run along the inner edge thereof, and at a respective straight run at one of the edges thereof with means being located at said respective straight run to urge the belt and the endless chain toward each other to maintain the frictional engagement between the belt and the frictional driving elements.

17. A conveyor system according to claim 16, wherein said supplemental friction drive means are located at opposed positions on both sides of the belt along said respective straight run.

18. A conveyor system which comprises
an endless flat conveyor belt made up of a plurality of links collapsibly connected together to permit the belt to bend selectively edgewise within its own plane, and
a belt supporting and driving assembly comprising
a support rail to support said belt with a substantially horizontal cross-section in an endless path extending longitudinally and curving edgewise in its own plane through a spiral having a plurality of vertically spaced loops defining a cylinder, said rail engaging the bottom of the belt near the outer edge thereof substantially throughout the length of said loops,
frictional drive means for moving said belt through said spiral, said frictional drive means comprising an endless chain extending parallel to said inner edge of said belt and having connected thereto at spaced locations a plurality of vertical frictional driving elements engaging said inner edge in sliding frictional driving relation substantially throughout the length of said loops and a plurality of horizontal frictional driving and supporting elements extending under said inner edge in frictional driving and supporting engagement with the bottom of said belt adjacent said inner edge substantially throughout the length of said loops, and power means for driving said chain, and
positive driving means engaging said belt to drive said belt at a predetermined speed, said power means for driving said chain being operative to move said frictional driving elemenets at a faster rate than said inner belt edge when said belt is moving at said predetermined speed.

19. A conveyor system according to claim 18, wherein said belt is supported in a second spiral superimposed upon said cylinder with the loops of said second spiral defining circles equal and coaxial with the circles of the first named spiral and alternatingly spaced therebetween, said belt and said friction drive means passing upwardly in one circumferential direction along one of said spirals, turning around at the top of said spirals and passing downwardly in the opposite circumferential direction along the other of said spirals, said belt having the same conveying surface facing upwardly throughout said passing upwardly, turning around and passing downwardly, one edge of the belt defining said inner edge during said passing upwardly and the other edge of the belt defining said inner edge during said passing downwardly, and further comprising means to transfer said friction drive means from said one edge to said other edge at the top of said spirals.

* * * * *